(12) United States Patent
Swab

(10) Patent No.: US 11,541,727 B2
(45) Date of Patent: Jan. 3, 2023

(54) CARGO TRANSPORT HEATING SYSTEM

(71) Applicant: CARRIER CORPORATION, Palm Beach Gardens, FL (US)

(72) Inventor: Michael Thomas Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 250 days.

(21) Appl. No.: 16/465,797

(22) PCT Filed: Dec. 1, 2017

(86) PCT No.: PCT/US2017/064121
§ 371 (c)(1),
(2) Date: May 31, 2019

(87) PCT Pub. No.: WO2018/102636
PCT Pub. Date: Jun. 7, 2018

(65) Prior Publication Data
US 2020/0023711 A1    Jan. 23, 2020

Related U.S. Application Data

(60) Provisional application No. 62/429,117, filed on Dec. 2, 2016.

(51) Int. Cl.
  *B60H 1/03*   (2006.01)
  *B60H 1/32*   (2006.01)
  *B60H 1/00*   (2006.01)

(52) U.S. Cl.
  CPC ....... *B60H 1/3232* (2013.01); *B60H 1/00014* (2013.01); *B60H 1/00364* (2013.01); *B60H 1/034* (2013.01); *B60H 1/00885* (2013.01)

(58) Field of Classification Search
  CPC .. B60H 1/00014; B60H 1/00364; B60H 1/34; B60H 1/00885; B60H 1/3232; B60H 1/04; B60H 1/034
  See application file for complete search history.

(56) References Cited

U.S. PATENT DOCUMENTS 1,608,982 A     11/1926  Hatch
2,762,570 A  *   9/1956  Zimmerman ...... G05D 23/1393
                                                237/12.3 B (Continued)

FOREIGN PATENT DOCUMENTS

CN    204279203 U    4/2015
CN    104812621 A    7/2015
(Continued)

OTHER PUBLICATIONS

Search Report for PCT Application No. PCT/US2017/064121 dated Mar. 23, 2018; 6 pages.

(Continued)

*Primary Examiner* — Steven B McAllister
*Assistant Examiner* — John E Bargero
(74) *Attorney, Agent, or Firm* — Cantor Colburn LLP

(57) ABSTRACT

A cargo transport heating system is utilized for a truck that includes a cargo containment and a combustion engine having a coolant inlet and a coolant outlet. The cargo transport heating system includes a heat exchanger, a coolant pump, and a combustion engine coolant having a low toxicity. The heat exchanger is disposed in the cargo containment, and is in fluid communication with the first coolant inlet. The coolant pump is in fluid communication with the coolant outlet and the heat exchanger, and pumps the combustion engine coolant through the first coolant inlet, the coolant outlet, and the heat exchanger.

13 Claims, 2 Drawing Sheets

(56) References Cited

U.S. PATENT DOCUMENTS

| | | | |
|---|---|---|---|
| 3,236,220 A * | 2/1966 | Holmes | F02N 19/10 |
| | | | 123/142.5 R |
| 4,398,081 A | 8/1983 | Moad | |
| 4,523,631 A | 6/1985 | McKinney | |
| 4,591,691 A * | 5/1986 | Badali | B60H 1/034 |
| | | | 123/142.5 E |
| 5,791,407 A * | 8/1998 | Hammons | B60H 1/2221 |
| | | | 123/142.5 E |
| 5,908,069 A | 6/1999 | Baldwin et al. | |
| 5,921,092 A | 7/1999 | Behr et al. | |
| 6,973,799 B2 | 12/2005 | Kuehl et al. | |
| 7,719,126 B2 * | 5/2010 | Foreman | B60H 1/00378 |
| | | | 290/4 A |
| 8,206,607 B2 | 6/2012 | Evans et al. | |
| 9,188,053 B2 * | 11/2015 | Abihana | F01P 7/164 |
| 2003/0052302 A1 | 3/2003 | Eaton et al. | |
| 2005/0023503 A1 | 2/2005 | Pearce et al. | |
| 2006/0216166 A1 | 9/2006 | Pawellek | |
| 2009/0183696 A1 * | 7/2009 | O'Flynn | F01P 7/16 |
| | | | 123/41.1 |
| 2009/0250190 A1 | 10/2009 | Siegenthaler | |
| 2009/0288445 A1 | 11/2009 | Anikhindi et al. | |
| 2009/0293525 A1 | 12/2009 | Monforte | |
| 2010/0001086 A1 | 1/2010 | Bhatti et al. | |
| 2013/0192271 A1 | 8/2013 | Barnhart et al. | |
| 2014/0223933 A1 | 8/2014 | Steele et al. | |
| 2014/0250941 A1 | 9/2014 | Steele | |
| 2015/0066263 A1 | 3/2015 | Abihana | |
| 2016/0290730 A1 | 10/2016 | Taras | |

FOREIGN PATENT DOCUMENTS

| | | |
|---|---|---|
| WO | 2010129801 A1 | 11/2010 |
| WO | 2012080771 A1 | 6/2012 |
| WO | 2013043389 A1 | 3/2013 |

OTHER PUBLICATIONS

Written Opinion for PCT Application No. PCT/US2017/064121 dated Mar. 23, 2018; 7 pages.

Chinese Office Action Issued in Chinese Application No. 201780074611.2 dated Jul. 5, 2021; 9 Pages.

\* cited by examiner

CARGO TRANSPORT HEATING SYSTEM

CROSS-REFERENCE TO RELATED APPLICATIONS

This application claims the benefit of PCT/US2017/064121 filed Dec. 1, 2017, which claims priority to U.S. Provisional Application No. 62/429,117 filed Dec. 2, 2016, which is incorporated herein by reference in its entirety.

BACKGROUND

The present disclosure relates to cargo transport heating systems and, more particularly, to a cargo transport heating system utilizing engine coolant from a combustion engine utilized for vehicle propulsion.

Traditionally, cargo transport heating systems, utilized to heat ambient air in a cargo containment typically transported via a truck or tractor, may utilize heat dissipated from a running combustion engine to heat the ambient air. In one example, the heat may be transferred from the engine and to a remote heat exchanger by a flowing engine coolant. The flow of the coolant is created by a mechanical pump coupled to the engine. Unfortunately, pump speed and thus flow volume is dependent upon engine operating speed. This dependency makes it difficult to keep both the ambient air and the engine at optimal temperatures.

BRIEF DESCRIPTION

A cargo transport heating system according to one, non-limiting, embodiment of the present disclosure, is for a truck that includes a cargo containment and a combustion engine having a first coolant inlet and a coolant outlet. The cargo transport heating system includes a heat exchanger disposed in the cargo containment, and in fluid communication with the first coolant; a coolant pump in fluid communication with the coolant outlet and the heat exchanger; and a combustion engine coolant having a low toxicity, wherein the coolant pump pumps the combustion engine coolant through the first coolant inlet, the coolant outlet, and the heat exchanger.

Additionally to the foregoing embodiment, the combustion engine coolant is propylene glycol.

In the alternative or additionally thereto, in the foregoing embodiment, the cargo transport heating system includes an engine coolant heater for heating of the coolant flowing into the combustion engine.

In the alternative or additionally thereto, in the foregoing embodiment, the engine coolant heater is disposed between and in fluid communication with the coolant pump and a second coolant inlet of the combustion engine.

In the alternative or additionally thereto, in the foregoing embodiment, the engine coolant heater is an electric engine coolant heater.

In the alternative or additionally thereto, in the foregoing embodiment, the cargo transport heating system includes a flow control valve disposed between and in fluid communication with the coolant pump and the heat exchanger.

In the alternative or additionally thereto, in the foregoing embodiment, the cargo transport heating system includes a flow control valve disposed between and in fluid communication with the coolant pump and the heat exchanger.

In the alternative or additionally thereto, in the foregoing embodiment, the coolant pump is a variable speed electric coolant pump.

In the alternative or additionally thereto, in the foregoing embodiment, the cargo transport heating system includes an electric fan for propelling air across the heat exchanger.

In the alternative or additionally thereto, in the foregoing embodiment, the cargo transport heating system includes a battery for providing electric energy to the engine coolant heater.

In the alternative or additionally thereto, in the foregoing embodiment, the battery is constructed and arranged to be electrically charged by an alternator of the combustion engine.

In the alternative or additionally thereto, in the foregoing embodiment, the cargo transport heating system includes a shore power inverter configured to provide electric energy to the engine coolant heater when the combustion engine is not running.

In the alternative or additionally thereto, in the foregoing embodiment, the cargo transport heating system includes a controller; a cargo temperature sensor disposed in the cargo containment for measuring cargo air temperature, wherein the temperature sensor is configured to output a cargo temperature signal to the controller; and an engine temperature sensor configure to measure engine temperature and output an engine temperature signal to the controller, wherein the controller is configured to receive the air and engine temperature signals and based, at least in-part, on the air and engine temperature signals, output at least one command signal to at least one of the flow control valve, the coolant pump, and the coolant heater.

In the alternative or additionally thereto, in the foregoing embodiment, the coolant is propylene glycol.

A cargo transport truck according to another, non-limiting, embodiment includes a cargo compartment for containment of a cargo; a combustion engine for propulsion, the combustion engine including a coolant inlet and a coolant outlet for the flow of a coolant through the combustion engine; a heat exchanger disposed in the cargo compartment and in fluid communication with the coolant inlet and coolant outlet; and a variable speed, electric, coolant pump for flowing the coolant.

In the alternative or additionally thereto, in the foregoing embodiment, the coolant is propylene glycol based.

In the alternative or additionally thereto, in the foregoing embodiment, the cargo transport truck includes an electric coolant heater for heating of the coolant flowing into the combustion engine, wherein the electric coolant heater is disposed between and in fluid communication with the coolant pump and a coolant inlet of the combustion engine.

In the alternative or additionally thereto, in the foregoing embodiment, the cargo transport truck includes a thermostatic valve disposed between and in fluid communication with the coolant pump and the heat exchanger.

In the alternative or additionally thereto, in the foregoing embodiment, the cargo transport truck includes an electric fan disposed in the cargo containment for driving air across the heat exchanger.

In the alternative or additionally thereto, in the foregoing embodiment, the cargo transport truck includes a battery for providing electric energy to the engine coolant heater.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
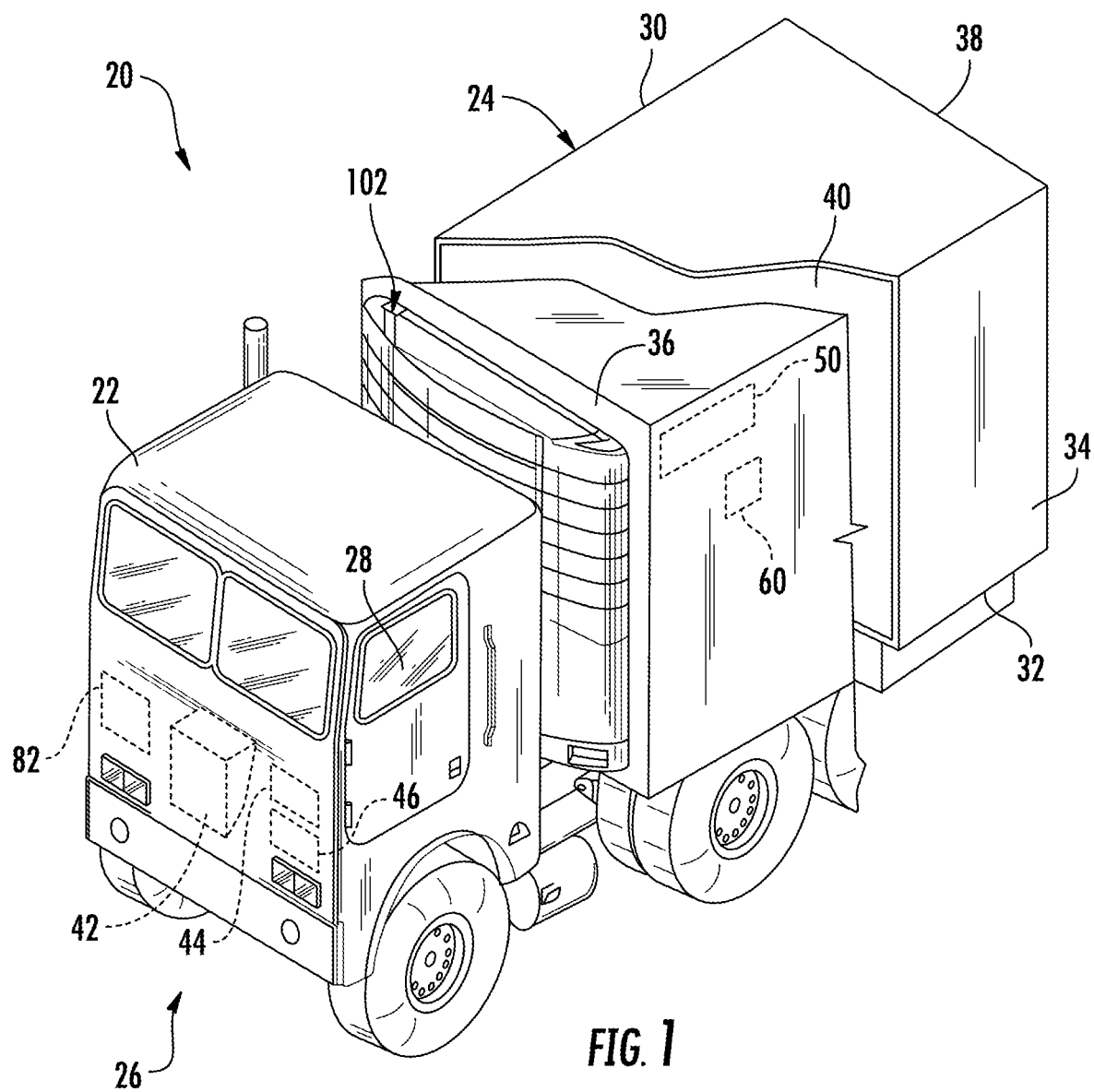
FIG. 1 is a perspective view of a cargo transporting truck utilizing a cargo transport heating system as one, non-limiting, embodiment of the present disclosure.
Figure 2:
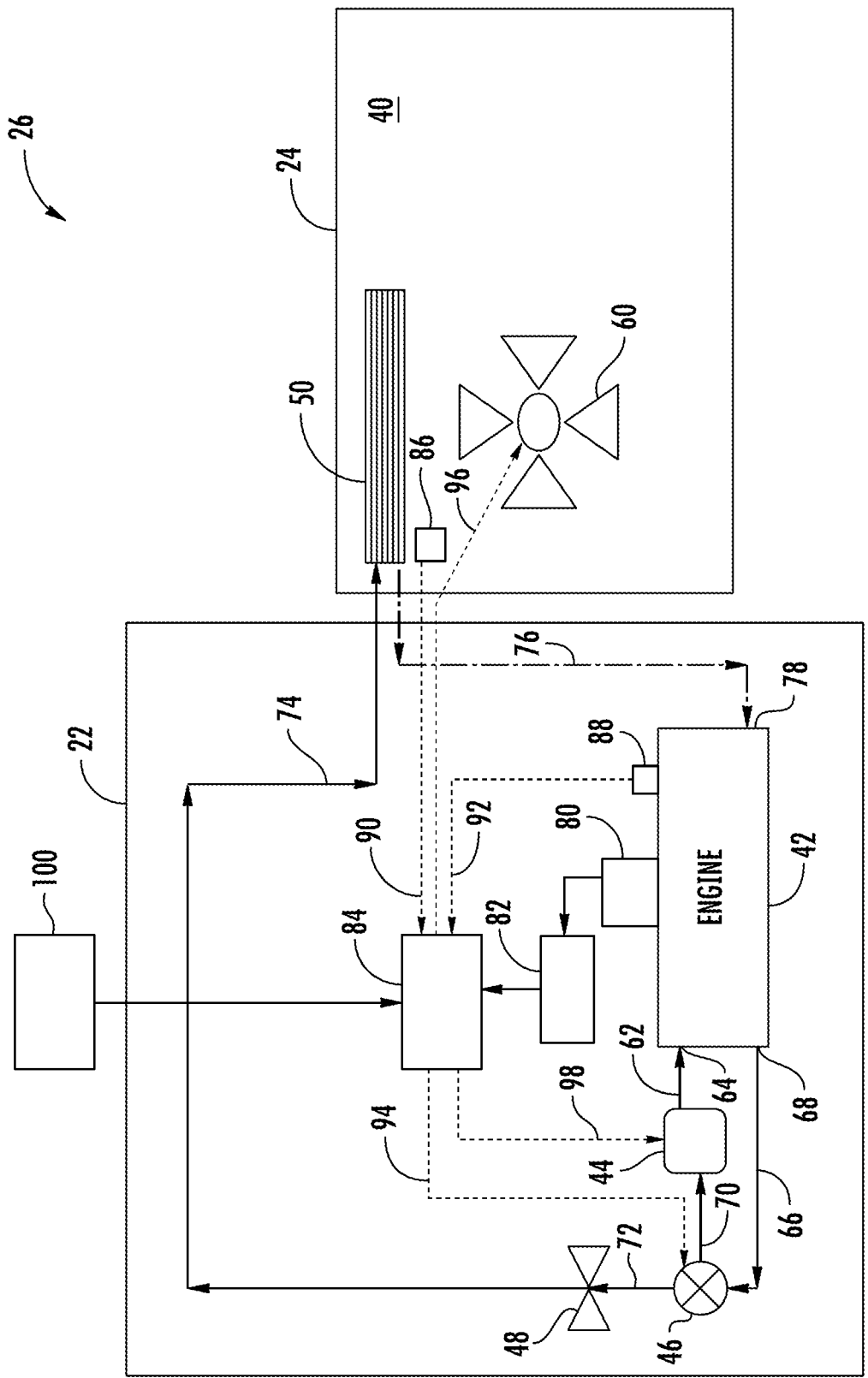
FIG. 2 is a schematic of the cargo transport heating system.

Referring to FIGS. 1 and 2, a cargo transporting truck 20 of the present disclosure is illustrated. In one embodiment, the cargo transporting truck 20 may be a tractor trailer system including a tractor 22, a trailer 24 and a cargo transport heating system 26. The tractor 22 may include an operator's compartment or cab 28 and a combustion engine 42 that may be part of the powertrain or drive system of the tractor 22 for propulsion. In another embodiment, the combustion engine 42, or a separate combustion engine, may be a dedicated part of the cargo transport heating system 26.

The trailer 24 may be coupled to the tractor 22 and is thus pulled or propelled to desired destinations. The trailer 24 may include a top wall 30, a bottom wall 32 opposed to and space from the top wall 30, two side walls 34 spaced from and opposed to one-another, and opposing front and rear walls 36, 38 with the front wall 36 being closest to the tractor 22. The trailer 24 may further include doors (not shown) at the rear wall 38, or any other wall. The walls 30, 32, 34, 36, 38, together, define the boundaries of a cargo compartment 40. It is contemplated and understood that the cargo transporting truck 20 may not include a trailer, and instead, may include a cargo compartment 40 carried or supported by a chassis frame that may also support a cab and the combustion engine 42 as part of the powertrain that facilitates propulsion.

The trailer 24 is generally constructed to store a cargo (not shown) in the compartment 40. The tractor 22 and the trailer 24 is one, non-limiting, example of an application for the cargo transport heating system 26, which may be partially integrated into the trailer 24 and generally mounted to the front wall 36. The cargo is maintained at a desired temperature by heating of the compartment 40 via the cargo transport heating system 26, by the circulation of air through the cargo compartment 40 of the trailer 24. It is contemplated and understood that the cargo transport heating system 26 may be applied to any transport container and not necessarily those used in trucks or tractor trailer systems. Furthermore, the transport container may be constructed and arranged to be removable from a framework and wheels (not shown) of the trailer 24 for alternative shipping means (e.g., marine, rail, flight, and others). In such an application, the combustion engine 42 may be dedicated part of the cargo transport heating system 26 and is generally carried by the transport container. In the embodiment where the combustion engine 42 is part of the vehicle powertrain, an alternative means for heat may be available when the transport container is remote from the tractor.

Referring to FIG. 2, the cargo transport heating system 26 may include an engine coolant heater 44, a coolant pump 46, a flow control valve 48, a heat exchanger 50 and a fan 60.

The cargo transport heating system 26 may further include a plurality of conduits or passages to flow an engine coolant between components. A first return conduit 62 may extend between, and is in fluid communication with, the heater 44 and a first coolant inlet 64 carried by the combustion engine 42. A supply conduit 66 may extend between, and is in fluid communication with, the pump 46 and a coolant outlet 68 carried by the combustion engine 42. A heater supply conduit 70 may extend between, and is in fluid communication with, the pump 46 and the inlet side of the heater 44. A valve supply conduit 72 may extend between and is in fluid communication with, an outlet of the pump 46 and an inlet of the valve 48. A heat exchanger supply conduit 74 may extend between, and is in fluid communication with, an outlet of the valve 48 and an inlet of the heat exchanger 50. An engine supply conduit 76 may extend between, and is in fluid communication with, an outlet of the heat exchanger 50 and a second coolant inlet 78 carried by the combustion engine 42.

The heat exchanger 50 and the fan 60 of the cargo transport heating system 26 may be generally located in the cargo compartment 40. In some truck 20 applications, the heater 44, pump 46, and valve 48 may be generally located proximate to the combustion engine 42. For example and in the embodiment where the combustion engine 42 is part of the vehicle powertrain, the heater 44, pump 46 and valve 48 may be located in an engine compartment of a cab of the truck 20. In the example of a tractor trailer system 20, the heat exchanger 50 and fan 60 may be carried by the trailer 24, and the heater 44, pump 46, and valve 48 may be carried by the tractor 22 if the combustion engine is part of the vehicle powertrain. The conduits 74, 76 may then extend between the tractor 22 and the trailer 24. To facilitate detachment of the tractor 22 from the trailer 24, the conduits 74, 76 may also be detachable (e.g., quick disconnects).

In yet another embodiment, the cargo transport heating system 26 may be part of a transport refrigeration unit mounted and/or supported by a forward portion of the trailer 24 of the tractor trailer system 20. In this example, the combustion engine 42 may be a dedicated part of the transport refrigeration unit for powering various components of the unit. For example, the engine 42 may drive a generator that provides electrical power to a compressor, fans, and other refrigeration components when the unit is in a refrigeration mode, and provides heat via, at least in part, hydronics, when in a heating mode.

The heater 44 of the cargo transport heating system 26 may be an electric heater, the coolant pump 46 may be an electric, variable speed, coolant pump, and the flow control valve 48 may be a thermostatic valve or electronic variable valve. The truck 20 may further include an electric alternator 80 (i.e., generator) driven by the combustion engine 42 and a battery 82 that may be electrically charged by the alternator 80. The battery 82 may provide electric power to run at least the heater 44, the coolant pump 46, and a controller 84 of the cargo transport heating system 26. The controller 84 may be configured to generally control the flow of coolant between the combustion engine 42 and the heat exchanger 50.

The cargo transport heating system 26 may further include a temperature sensor 86 for measuring and monitoring air temperature in the cargo compartment 40, and a temperature sensor 88 for measuring temperature of the combustion engine 42. The temperature sensors 86, 88 are configured to send respective temperature signals (see arrows 90, 92) to the controller 84 over pathways that may be wired or wireless.

In operation, coolant is drawn out of the combustion engine 42 and through conduit 66, via the coolant pump 46. The coolant pump 46 may receive command signal(s) and/or power (see arrow 94) from the controller 84 based on the temperature signals 90, 92 processed by a processor (e.g., microprocessor with a computer readable and writeable storage medium) of the controller 84. For example, if the combustion engine 42 is running and the cargo compartment 40 requires more heat as indicated by the temperature sensor 86, the controller 84 may increase the running speed of the coolant pump 46.

The flow control valve 48 may be a type of self-regulating, thermostatic valve constructed and arranged to, for example, control a ratio of flow between the conduits 70, 72 at the outlet of the pump 46. The valve 48 may be adapted to open with increasing coolant temperature at the pump 46 outlet, or increasing coolant temperature in conduit 72. As coolant temperature increases, a greater volume of coolant flows through conduit 74 and into the heat exchanger 50 for heating the cargo containment 40. With heated coolant flowing through the heat exchanger 50, the fan 60 may receive a command signal and/or power (see arrow 96) from the controller 84 to circulate air through the heat exchanger 50 thereby heating the compartment 40. It is contemplated and understood that other system configurations and conduit arrangements may be applied. For example, the valve 48 may be a self-regulating mixing valve or a flow control valve directly operated and controlled by the controller 84 base on any number of temperature sensor signals.

During cold start conditions, the combustion engine 42 may be cold (i.e., below an optimal running temperature, the valve 48 may be closed, and the cargo compartment 40 may be heated by an alternative means if necessary. When starting the engine 42, the heater 44 may first receive a command signal and/or power (see arrow 98) from the controller 84 based, at least in-part, on the engine temperature signal 88. The electric pump 46 may run at a speed controlled by the controller 84, and coolant will flow through conduit 66, through the pump 46, through the conduit 70, through the initialized heater 44, through the conduit 62 and back into the engine 42 as a pre-heated coolant. With the valve 48 closed, little to no coolant flows through the conduits 74, 76 and the heat exchanger 50. When the combustion engine 42 is operating at or near an optimal temperature, the controller may de-energize the electric heater 44. During cold weather conditions and with the running combustion engine and the cargo compartment 40 both requesting additional heat, the controller 84 may re-initial the electric heater 44 as a supplemental heat source, and may further increase pump 46 speed.

In one embodiment, the cargo may be a food product, and the coolant may be propylene glycol, or other non-toxic coolant that may have a heat transfer coefficient that is less than the heat transfer coefficient of more traditional engine coolants such as ethylene glycol. In the present embodiment, the variable speed, electric, coolant pump 46 may generally replace more traditional mechanical pumps with flow rates generally fixed to engine speeds. The variable speed, electric, coolant pump 46 facilitates coolant flow adjustment that optimizes the balance between heat required for optimal engine operation and for optimal cargo heat.

The heater 44, the pump 46, and the fan 60 may be powered by a direct current source at about twelve (12) volts. When the engine is not running and power is not available from the battery 82, the system 26 may be configured to connect to a shore power source 100 having an inverter. When connected, the controller 84 may initial the heater 44, and thereby heat the cargo containment 40.

In another embodiment, the cargo transporting truck 20 may include a transport refrigeration unit 102 (see FIG. 1) as is typically known in the art. In this embodiment, the heat exchanger 50 of the cargo transport heating system 26 may be located inward from an evaporator (not shown) of the transport refrigeration unit 102, and the fan 60 may be an evaporator fan. With this configuration, the cargo transport heating system 26 may generally serve a dual purpose. The first purpose is to heat the cargo containment as previously described, and the second purpose may be to defrost the evaporator of the transport refrigeration unit 102.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A cargo transport heating system for a truck including a cargo containment and a combustion engine having first and second coolant inlets and a coolant outlet, the cargo transport heating system comprising:
   a heat exchanger disposed in the cargo containment, and in direct fluid communication with the second coolant inlet;
   a coolant pump disposed between the coolant outlet and the heat exchanger, in direct fluid communication with the coolant outlet, and in fluid communication with the heat exchanger;
   a combustion engine coolant having a low toxicity, wherein the coolant pump pumps the combustion engine coolant through the first coolant inlet, the coolant outlet, and the heat exchanger;
   an engine coolant heater for heating of the coolant flowing into the combustion engine, wherein the engine coolant heater is disposed between and in fluid communication with the coolant pump and in direct fluid communication with the first coolant inlet of the combustion engine, and wherein the coolant heater is in direct fluid communication with the coolant pump located upstream of the coolant heater and is in direct fluid communication with the first coolant inlet located downstream of the coolant heater; and
   a flow control valve disposed between and in fluid communication with the coolant pump disposed upstream from the flow control valve and the heat exchanger disposed downstream from the flow control valve, wherein the flow control valve is constructed to open with increasing coolant temperature measured upstream.

2. The cargo transport heating system set forth in claim 1, wherein the combustion engine coolant is propylene glycol.

3. The cargo transport heating system set forth in claim 1, wherein the engine coolant heater is an electric engine coolant heater.

4. The cargo transport heating system set forth in claim 3 further comprising:

a flow control valve disposed between and in direct fluid communication with the coolant pump and the heat exchanger.

5. The cargo transport heating system set forth in claim 4, wherein the coolant pump is a variable speed electric coolant pump.

6. The cargo transport heating system set forth in claim 1 further comprising:
an electric fan for propelling air across the heat exchanger.

7. The cargo transport heating system set forth in claim 3 further comprising:
a battery for providing electric energy to the engine coolant heater.

8. The cargo transport heating system set forth in claim 7, wherein the battery is constructed and arranged to be electrically charged by an alternator of the combustion engine.

9. The cargo transport heating system set forth in claim 8 further comprising:
a shore power inverter configured to provide electric energy to the engine coolant heater when the combustion engine is not running.

10. A cargo transport truck comprising:
a cargo compartment for containment of a cargo;
a combustion engine for propulsion, the combustion engine including a second coolant inlet and a coolant outlet for the flow of a coolant through the combustion engine;
a heat exchanger disposed in the cargo compartment and in fluid communication with the second coolant inlet and coolant outlet, wherein the heat exchanger is in direct fluid communication with the second coolant inlet;
a variable speed, electric, coolant pump for flowing the coolant;
an electric coolant heater for heating of the coolant flowing into the combustion engine through a first coolant inlet, wherein the electric coolant heater is disposed between and in direct fluid communication with the coolant pump and in direct fluid communication with the first coolant inlet of the combustion engine; and
a thermostatic valve disposed between and in fluid communication with the coolant pump disposed upstream from the thermostatic valve and the heat exchanger disposed downstream from the flow thermostatic, wherein the flow control valve is constructed to open with increasing coolant temperature measured upstream.

11. The cargo transport truck set forth in claim 10, wherein the coolant is propylene glycol based.

12. The cargo transport truck set forth in claim 10 further comprising:
an electric fan disposed in the cargo containment for driving air across the heat exchanger.

13. The cargo transport truck set forth in claim 12 further comprising:
a battery for providing electric energy to the engine coolant heater.

\* \* \* \* \*